June 16, 1964 A. MERINO ETAL 3,137,066
METHOD OF MAKING A LINED PIPE NIPPLE
Filed July 9, 1959 2 Sheets-Sheet 1

INVENTORS:
Alfonso Merino
William Y. Hahn

By Smyth & Roston
Attorneys

June 16, 1964  A. MERINO ETAL  3,137,066
METHOD OF MAKING A LINED PIPE NIPPLE
Filed July 9, 1959 2 Sheets-Sheet 2
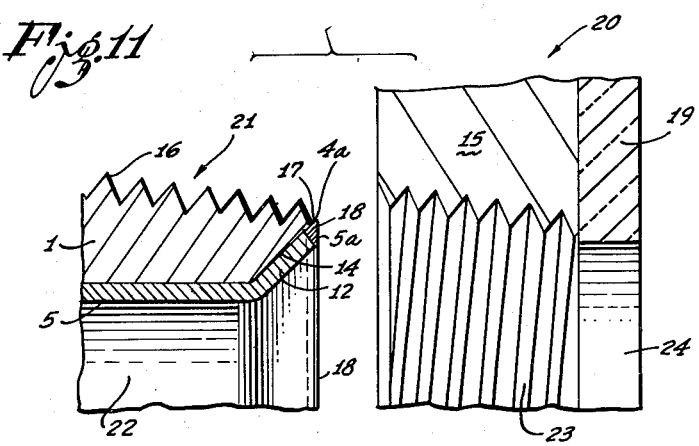
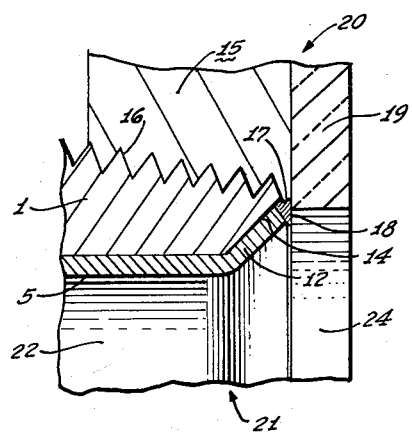
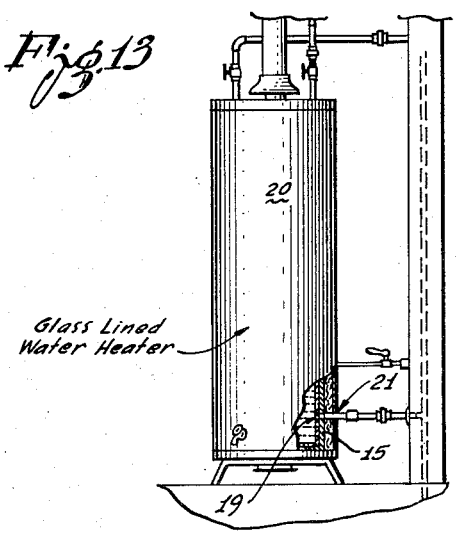
INVENTORS:
Alfonso Merino
William Y. Hahn
Attorneys

United States Patent Office 3,137,066
Patented June 16, 1964

3,137,066
METHOD OF MAKING A LINED PIPE NIPPLE
Alfonso Merino, 5318 Batavia Road, South Gate, Calif., and William Y. Hahn, 611 Nectarine St., Inglewood, Calif.
Filed July 9, 1959, Ser. No. 825,955
7 Claims. (Cl. 29—474.4)

This invention relates to lined pipes and to a method of making lined pipes. More particularly, this invention relates to lined pipe nipples and to a method of making such nipples where the pipe material is corrodible and the lining inserted therein is non-corrodible.

A pipe nipple is a short piece of pipe which may be threaded at one or both ends and which is utilized for connecting pipes. Various methods have been utilized for lining a corrodible outer pipe of steel or cast iron with a non-corrodible liner of material such as copper, brass or other materials which are susceptible to corrosion or oxidation by the water or other fluid passing therethrough. The lined pipes manufactured by these methods have all been found to leak between the non-corrodible liner and the corrodible pipe or outer shell. With leakage, the outer shell corrodes so that little improvement is achieved by the utilizing of the non-corrodible liner.

In a specific illustrative embodiment of this invention, a non-leaking pipe nipple is provided which has an outer corrodible shell and an inner non-corrodible liner. Bevels are formed at the ends of the shell at a particular angle and then bevels are formed at the ends of the liner at a smaller angle. The two different angular bevels at each end of the pipe nipple provide for a substantial circumferential angular space therebetween. The shell and the liner are heated to a temperature approaching that of a typical liquid solder and then are immersed at each end into a liquid solder so that solder fills the angular space between the beveled ends of the shell and the liner.

When the first end of the shell and the liner is dipped into the liquid solder, the air in the cylindrical space between the liner and the shell is expanded with some of it freely exiting through the still unsoldered opposite end through the angular space between the shell and the liner at the still unsoldered end of the pipe nipple. Thereafter, when the second end of the pipe nipple is immersed in the liquid solder, the remaining air in the space between the shell and the liner is further expanded so that some of it is forced through the still hot solder at the first end of the pipe nipple. After successively soldering both ends of the pipe nipple there, therefore, still remains a small air passage to the space between the shell and the liner due to the expansion of the air in that space when the second end of the pipe nipple is soldered.

With the solder at both ends still hot, the ends of the pipe nipple are formed to increase the bevel angle of the liner so that it presses the solder in the angular space between it and the bevel of the shell. The small air passage formed by the expanded air in the space between the shell and the liner is, in this manner, sealed.

Features of this invention relate to the provision of a lined pipe nipple in which the solder forms a part of the threads so as to completely seal the surface of the outer shell from the pipe contents. After the solder has cooled, both ends of the pipe nipple may be threaded with the distal thread being formed with some of the solder. When the pipe nipple is threaded into a receptacle, the relatively soft solder which forms part of the distal thread serves also to seal any spaces between the thread of the nipple and the threads of the threaded receptacle.

Further advantages and features of this invention will become apparent upon consideration of the following description when read in conjunction with the drawing wherein:

FIGURE 11 is an enlarged fragmentary sectional view of the lined pipe of this invention in position to be threadedly engaged in a pipe fitting;

FIGURE 12 is an enlarged fragmentary sectional view of the lined pipe of this invention threadedly engaged in a pipe fitting; and FIGURE 13 is a side elevational view of a glass lined water heater in which a nipple made according to the present invention is used.

Like characters of reference indicate corresponding parts in the different views.

Figure 1:
FIGURE 1 is a top and partially sectional view of a typical piece of corrodible pipe in which the inner surface thereof has been cleaned and smoothed prior to the insertion of a liner.
Figure 2:
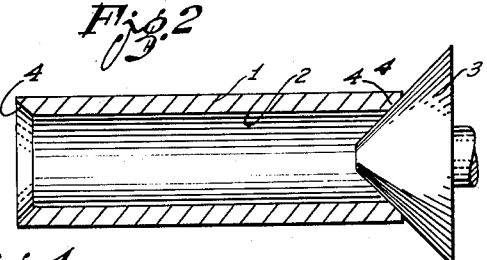
FIGURE 2 is a sectional view of the same pipe as in FIGURE 1 showing a reaming tool which is being employed to bevel one of the ends of the pipe.

Referring to FIGURES 1 through 8, which illustrate the steps, except for pre-heating, of making the pipe nipple of the present invention, FIGURE 1 shows a typical cast iron pipe body 1. The cast iron pipe body 1 may be, for example, of nipple length and have an inner surface 2 which is clean and smooth. The cleaning and smoothing operation may be performed in a typical manner, such as by reaming. The cast iron pipe 1 forms the outer shell of the pipe nipple of this invention. After cleaning and smoothing the surface 2, bevels 4 are formed at each end of the pipe 1. As illustrated in FIGURE 2, the bevels 4 may be formed by means of a conventional reaming tool 3 which is shown in position to complete a bevel in one end of the pipe 1. Here, the reaming tool 3 is shown to be making suitable bevel angle of approximately 45 degrees on the inside of the pipe so that the largest diameter of the bevel 4 will terminate in the end of the pipe.

Figure 3:
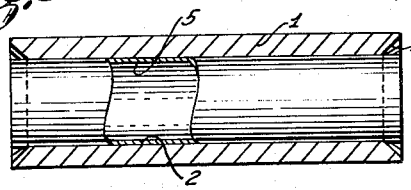
FIGURE 3 is a partial sectional view of the beveled pipe with the lining tube inserted therein.
Figure 4:
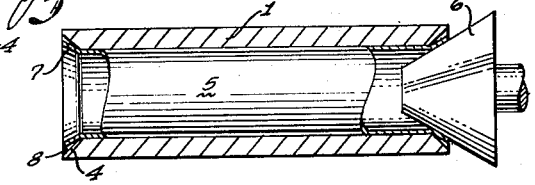
FIGURE 4 is a partial sectional view illustrating the use of a forming tool to bevel the ends of the tube so that they will be in a spaced relationship to corresponding bevels on the pipe.
Figure 5:
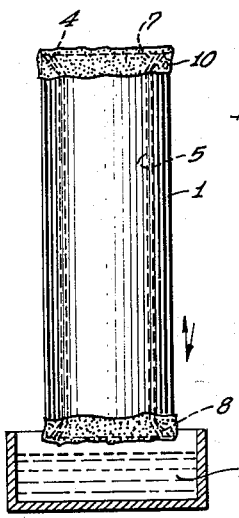
FIGURE 5 is a top view of the lined pipe illustrating its immersion in a liquid solder tank.
Figure 7:
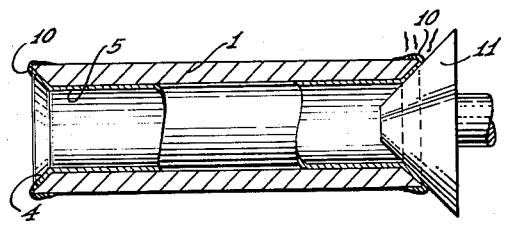
FIGURE 7 is a partial sectional view of the lined pipe after immersion in the solder illustrating the forming operation by which the ends of the tube are compressed against the solder which has been applied in the angular space between the bevel on the pipe and the bevel on the tube.

After the pipe 1 is bevelled, a non-corrodible liner is inserted. In FIGURE 3, the bevelled pipe 1 is shown with the non-corrodible liner or tube 5, of substantially the same length, snugly inserted therein. With the liner 5 inserted, a second bevelling step is initiated. As illustrated in FIGURE 4, a convenient 30 degree bevel forming tool 6 forms a bevel 7 at each end of the liner 5 and thus causes the two bevels at the opposite ends of the liner to engage the corresponding two bevels at the opposite ends of the pipe to interlock the liner mechanically with the pipe to hold the liner against axial shift relative to the pipe. As may be seen, the bevels 7 on the liner 5 and the bevels 4 on the outer pipe 1 form an annular space 8 therebetween which circumferentially is continuous. It is to be noted that with the liner tube 5 flared at each end, in the manner shown in FIG. 4 and again in the manner shown in FIG. 7, the liner tube is mechanically interlocked with the surrounding pipe for positive anchorage of the liner tube against longitudinal movement in either direction relative to the pipe. The interlocking of the liner tube with the pipe in this manner serves the important purpose of mechanically keeping the liner tube in the desired assembly position while the assembly is being handled for the purpose of carrying out the soldering operations. After the liner 5 has been so formed to have bevels 7 at each end thereof, the corrodible pipe 1 and the non-corrodible tube 5 may be heated to a temperature between approximately 200 and 280 degrees F. In this range of temperatures, the pipe 1 and tube 5 are at a temperature somewhat less than that of the liquifying temperature of a typical solder 9 (FIGURE 5). After heating, the ends of the pipe 1 and liner 5 at opposite ends of the pipe nipple are successively immersed in the liquid solder 9 to cause deposits of the molten solder to adhere to the relatively cool ends of the pipe and liner.

Figure 6:
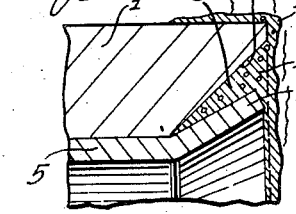
FIGURE 6 is an enlarged fragmentary sectional view of one end of the nipple and liner after they have been immersed in liquid solder.

In FIGURE 6, an enlarged view of one end of the nipple shows the deposited soft solder 10 on the exterior surface of the pipe nipple, in the angular space 8 between the bevel 4 on the pipe 1 and the bevel 7 on the lining 5, and extending beyond the end of the tube 5.

When one end of the pipe nipple is immersed in the liquid solder 9, it is further heated thereby to expand the air in the small cylindrical space between the snug-fitting liner 5 and the outer pipe 1. Since the other end of the pipe nipple is still unsealed, the expanded air freely escapes through the space 8 between the bevels 4 and 7. After dipping the first end in the solder 9, the pipe nipple is reversed and its second end is immersed with the first end still being relatively hot. The first end cools somewhat so that the air in the space between the liner 5 and the outer pipe 1 contracts with air entering through the open space 8 at the unsoldered end.

When the second end is soldered, the air between the liner 5 and the shell or pipe 1 is again or further heated. The expanded air between the liner 5 and the shell 1 now cannot freely exit because the first end is sealed by the still hot soft solder 10 (FIGURE 6). The expanding air exerts considerable pressure to force an air passage, illustrated by the bubbles 13 in FIGURE 6, from the cylindrical space between the liner 5 and the pipe 1 through the hot solder 10. If the process for forming the pipe nipple is halted at this point, the pipe nipple may still leak because of the air passage formed by the expanding air.

If the first end of the pipe nipple is permitted to cool before the second end is dipped in the solder, the amount of air in the space between the liner 5 and the pipe 1 is greater because it is cooler. When the second end is soldered the greater amount of trapped air is expanded to develop large pressures against the cooled solder at the first end tending to form a crack to exit the air. Halting the manufacturing process to cool the first end is in any event undesirable because it greatly extends the process time and cost for completing the fabrication of a pipe nipple.

Figure 8:
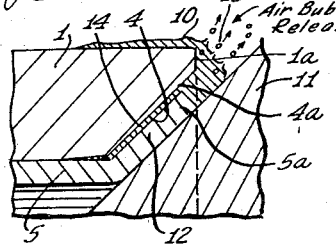
FIGURE 8 is an enlarged fragmentary sectional view lined pipe illustrating the forming tool compression of the tube bevel against the solder and the pipe bevel.
Figure 10:
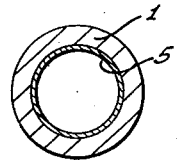
FIGURE 10 is a sectional view taken along the line 10—10 of FIGURE 9.

The air passage formed by the expanding air when the second end of the pipe nipple is soldered, is closed by a second bevelling operation of the end of liner 5. In FIGURE 8, a forming tool 11 is shown to have expanded the 30 degree bevel (bevel 7 in FIGURE 6) on the end of the tube 5 into a final bevel 12 in a pressure relationship with the bevel 4 on the pipe 1 and with a layer of solder 14 between the bevels 4 and 12. Also in FIGURE 8, the air bubbles forming the air passageway are shown to have been released from the solder 10 due to the pressure of the forming tool 11. This operation occurs while the solder is still soft and may be approximately 200 degrees F.

If the liner 5 is substantially of the same length of the pipe 1 and has its ends in radial alignment with the ends of the pipe, as indicated in FIGURE 3, after the forming of the final bevel 12, there will be a portion 4a of bevel 4 uncovered by or extending beyond bevel 12. This uncovered bevel portion 4a extends between the end 5a of the liner or tube 5 and the end 1a of the pipe 1. As shown in FIGURE 8, the beveled surface 4a is coated with the solder 10 integral with the solder layer 14 formed between the two bevels 4 and 12. Further, the same solder seal extends outwardly of surface 1a and extends over the exterior surface of the pipe 1 adjacent its end. Thus, this solder seal extends from between the two bevels outwardly on to the ends of the tube and of the pipe and on the exterior surface of the pipe 1 adjacent the ends. It also would tend to extend on the interior surface of the tube 5 adjacent its ends, although as indicated in FIGURE 8, this would be wiped to a thin coating by the forming tool 11. Either the first end or both ends may be bevelled in this manner.

It is important to note that the beveling of the two ends of the thick-walled pipe 1 extends close to the outside diameter of the pipe, so that solder that is extruded by the final flaring of the liner tube is extruded close to the outside circumference of the pipe and readily flows over the outer circumference in the manner desired.

Figure 9:
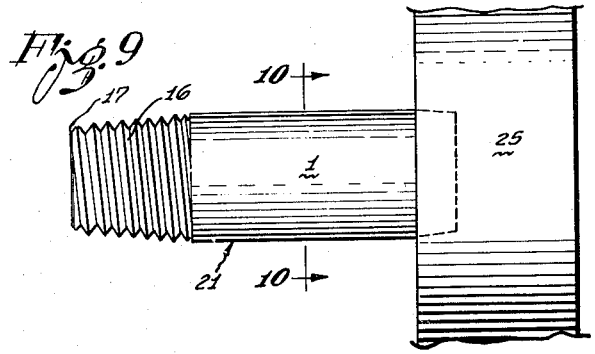
FIGURE 9 is a side view of the threaded nipple of this invention in a typical pipe fitting arrangement.

After the second beveling operation shaping the ends of the tube 5, the pipe 1 may be threaded. In FIGURE 9, a threaded embodiment of the invention in the form of nipple 21 is shown with the pipe 1 having external threads 16. The other is shown in a pipe-threading fixture 25 which is utilized to thread the ends of the nipple 21. A thread 17 shown at the end of the pipe nipple 21 at the left of FIGURE 9, is formed partially of solder being part of the integral solder seal formed on the exterior of the unthreaded pipe 1, as shown in FIGURE 8.

In FIGURES 11 through 13, the nipple 21 is shown in detail where it is employed, for example, in a threaded pipe fitting in a glass lined water heater 20 (FIGURE 13). The enlarged views of the nipple 21 in FIGURES 11 and 12 more clearly show a portion of threads 16, adjacent the end of the nipple, which is formed of the sealing solder. The end thread 17 is integral with the layer 14 formed between the bevels and with the portion of the sealing solder 18 which abuts the beveled portion 4a and the tube end 5a. The entire beveled surface 4a of the pipe 1 is, in this manner, sealed by the solder.

In FIGURE 12, the benefit of the aforesaid integral solder sealing surfaces is further illustrated. Here, the fitting is typically threadedly engaged in a metal wall 15 of the glass lined water heater 20 where the solder portion 18 abuts the metallic surface 15 in sealing relationship and also abuts the glass lining of the heater. The solder, of course, is softer than the wall 15 and, when the threads 16 of the nipple are tightened into the threaded opening 23 in the wall 15, a seal is developed by the solder 17 on the threads and the relatively soft solder 18 is compressed according to the pressure applied and to form a better seal integral and outwardly of the seal formed by the solder 14 between the two bevel surfaces. Thus, in FIGURE 12 the fluid passage 22 in the completed nipple 21 is in alignment with the fluid passage 24 through the glass liner of the water heater and the sealing solder 18 is in tight abutment with the glass lining 19 so as to prevent any fluid from entering between the two beveled surfaces spaced by solder 14.

It is to be noted that in FIG. 3 the liner or tube 5 is of substantially the same length as the outer pipe body 1, the two ends of the liner tube being flush with the two ends of the beveled pipe. When the two ends of the liner tube are flared, however, the axial length of the liner tube is shortened and the flared portions of the two ends of the liner tube fail to overlap completely the corresponding end bevels of the outer pipe. Thus, as may be seen in FIG. 8, an outer marginal portion of the bevel surface at each end of the outer pipe is exposed, and when the liner tube is subsequently further flared outward, a portion of the solder is extruded to form the solder bead 18 shown in FIG. 11, which solder bead makes sealing contact with the glass lining 19, as shown in FIG. 12.

The second beveling operation on the tube 5, therefore, provides for a number of advantages: it closes the air passage caused by the expanding air between the tube 5 and the pipe 1 as the second end of the nipple is soldered; it forces the solder about the surface 4a to completely seal the beveled surface 4 with the solder; and it provides solder for the threaded end to function as a sealing member when the pipe nipple is utilized in the water heater.

Although this invention has been described and illustrated in detail, it is to be clearly understood that the same is by way of illustration and example only and is not to be taken by way of limitation, the spirit and scope of this invention being limited only by the terms of the appended claims.

We claim:

1. A method of manufacturing a lined pipe including the steps of forming an outwardly opening bevel on the inner portion of the two opposite ends of an outer shell; inserting a metallic tube lining in said shell substantially the full length thereof, with the tube lining dimensioned to fit snugly in the pipe; forming each of the ends of said tube lining outwardly so that each end of said tube lining will have a beveled configuration at a bevel angle smaller than the bevel angle of the bevels at the ends of the shell so as to be spaced inwardly therefrom, applying liquid solder to both ends of said pipe and lining so as to substantially fill the space between the bevels and the tube lining at each end; and expanding said tube lining at both ends while the applied solder is still hot so that each end of said tube lining will be in substantial juxtaposition with the bevel on the corresponding end of said shell for engagement of both ends of the tube lining with both ends of the pipe to interlock the tube lining mechanically with the pipe against longitudinal movement in both directions relative to the pipe.

2. A method of lining a pipe and forming a seal between the lining and the pipe at each end thereof, comprising, cutting a bevel inwardly in each end of said pipe extending substantially to the outside diameter of the pipe so that the largest diameter of each bevel will be adjacent said ends; inserting a snug-fitting, non-corrodible metallic tube lining in said pipe, said tube lining being substantially the same length as said pipe and having its corresponding ends in radial alignment with those of said pipe; forming a bevel on each end of said tube liner outwardly toward the corresponding bevel on said pipe so that said corresponding bevels are spaced radially from each other at their ends to form tapered annular spaces; heating said pipe and tube to a temperature approaching that of liquid solder; immersing, one immediately after the other, each end of said pipe and tube in liquid solder so as to coat said bevels and fill said tapered annular spaces at each end of the pipe, and before the solder hardens, expanding said tube adjacent each end so that an end portion thereof will be substantially contiguous with a corresponding bevel on each end of said pipe.

3. A method of lining a pipe and forming a seal between the lining and the pipe at the ends thereof, comprising: making a smooth finish on the interior surface of said pipe; cutting a bevel inwardly in each end of said pipe; said bevels having their largest diameter at the respective ends of said pipe close to the outer circumference of the pipe; inserting a snug-fitting, non-corrodible metallic tube lining in said pipe, said tube lining being substantially the same length as said pipe and having its corresponding ends in substantial radial alignment with those of said pipe; forming a bevel in each end of said tube lining outwardly toward the corresponding bevel in said pipe so that said corresponding bevels are spaced radially from each other at their ends; heating said pipe and tube to a temperature approaching that of liquid solder; immersing each end of said pipe and tube lining in liquid solder so as to coat said bevels and so as to fill the spaces therebetween, one end being immersed a short period after the other before the solder in the first end hardens; and expanding each of said bevel tube ends, before the solder hardens, to be substantially in juxtaposition with a corresponding pipe bevel so as to compress a layer of solder between said tube and pipe bevels, and form a solder seal on the surfaces of said pipe bevels.

4. A method of lining a pipe nipple having external threads on at least one end thereof including forming a seal between the lining and the nipples at the ends thereof, comprising: reaming the interior of said nipple to provide a smooth, clean surface; reaming a frustro-conical bevel surface inwardly in each end of said nipple, said bevel surfaces having their largest diameter at the respective ends of said nipple close to the outer circumference of the nipple; inserting a snug-fitting non-corrodible metallic tube lining in said nipple; said tube lining being substantially the same length as said nipple, the corresponding ends of each being fitted in substantial radial alignment; forming a frustro-conical bevel surface in each end of said tube lining outwardly toward the corresponding bevel in said nipple so that said corresponding bevels are spaced radially from each other at their ends; heating said nipple and tube lining to a temperature approaching that of liquid solder; immersing each end of said nipple and tube lining in liquid solder so as to coat said bevels and substantially fill the spaces therebetween, one end being immersed a short period after the other before the solder in the first end hardens; swaging each of the ends of said beveled tube lining outwardly before the solder hardens, to be substantially in juxtaposition with a corresponding pipe bevel so as to compress a layer of solder between said tube and nipple bevels and force air from between the beveled ends of said tube lining and said nipple, and removing excess solder from said ends but leaving said seal intact with a coat of solder extending around said ends from the exterior of said tube bevel to and including a portion of said threads.

5. A method of lining a pipe including, the steps of cutting a bevel inwardly at each end of the pipe so that the largest diameter of the bevels are at the ends of the pipe close to the outer circumference of the pipe, inserting a snug-fitting metallic lining in the pipe, which has the same length as that of the pipe, forming a bevel in each end of the lining but at a smaller bevel angle than that of the pipe bevels so that the bevels on the lining are angularly spaced from the bevels on the pipe, successively immersing the two ends of the pipe and lining in a liquid solder so as to substantially fill the angular spaces between the bevels at each end, and forming at least the beveled end of the lining which is the first of the two ends to be immersed in the solder so as to increase the bevel angle and compress the solder in the angular space between said first immersed end of the lining and the associated pipe bevel before the solder hardens whereby any passway through the angular space is closed.

6. A method of lining a pipe and forming a seal between the lining and the pipe at the ends thereof, comprising: making a smooth finish on the interior surface of said pipe; cutting a bevel inwardly in each end of said pipe; said bevels having their largest diameter at the respective ends of said pipe; inserting a snug-fitting, non-corrodible metallic tube lining in said pipe, said tube lining being substantially the same length as said pipe and having its corresponding ends in substantial radial alignment with those of said pipe; forming a bevel in each end of said tube lining outwardly toward the corresponding bevel in said pipe so that said corresponding bevels are spaced radially from each other at their ends; heating said pipe and tube to a temperature approaching that of liquid solder; immersing each end of said pipe and tube lining in liquid solder so as to coat said bevels and so as to fill the spaces therebetween, one end being immersed a short period after the other before the solder in the first end hardens; and swaging outwardly at least the beveled end of the lining which is the first of the two ends to be immersed in the solder so as to increase the bevel angle and compress the solder between the two corresponding bevels before the solder hardens.

7. A method of manufacturing a lined nipple including the steps of:
  forming an outwardly opening bevel on the inner portion of the two opposite ends of a threaded pipe nipple;
  inserting a metallic tube lining in said nipple substantially the full length thereof with the tube lining dimentioned to fit snugly in the nipple;
  applying liquid solder to both ends of said nipple and lining so as to substantially fill the space between the bevel and the tube lining at each end; and
  flaring said tube lining at both ends with consequent shortening of the tube lining while the applied solder is still soft to cause each end of the tube lining to be in substantial juxtaposition with the bevel on the corresponding end of the nipple with an outer marginal portion of each bevel of the nipple exposed beyond each end of the tube lining, whereby the flaring of each end of the tube lining extrudes a bead of solder onto the corresponding adjacent exposed portion of the bevel of the nipple to serve as a seal when the nipple is subsequently screwed into a complementary threaded member.

References Cited in the file of this patent

UNITED STATES PATENTS

| | | |
|---|---|---|
| 443,698 | Meyer | Dec. 30, 1890 |
| 463,755 | Homer | Nov. 24, 1891 |
| 584,008 | Munson | June 8, 1897 |
| 627,992 | Everson | July 4, 1899 |
| 1,193,667 | Corey | Aug. 8, 1916 |
| 2,503,429 | Ziegler | Apr. 11, 1950 |
| 2,984,901 | Cunningham et al. | May 23, 1961 |

FOREIGN PATENTS

| | | |
|---|---|---|
| 552,154 | Belgium | Apr. 27, 1957 |